United States Patent
Peng et al.

(10) Patent No.: US 11,391,948 B2
(45) Date of Patent: Jul. 19, 2022

(54) DISPLAY ILLUMINATION USING A GRATING

(71) Applicant: Facebook Technologies, LLC, Menlo Park, CA (US)

(72) Inventors: Fenglin Peng, Redmond, WA (US); Liangyu Qiu, Redmond, WA (US); Ying Geng, Bellevue, WA (US); Tanya Malhotra, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 214 days.

(21) Appl. No.: 16/799,607

(22) Filed: Feb. 24, 2020

(65) Prior Publication Data
US 2021/0072543 A1    Mar. 11, 2021

Related U.S. Application Data

(60) Provisional application No. 62/898,450, filed on Sep. 10, 2019.

(51) Int. Cl.
*G02B 27/01* (2006.01)
*G02B 27/42* (2006.01)
(Continued)

(52) U.S. Cl.
CPC ....... *G02B 27/0172* (2013.01); *G02B 27/288* (2013.01); *G02B 27/425* (2013.01);
(Continued)

(58) Field of Classification Search
CPC .............. G02B 27/0172; G02B 27/288; G02B 27/425; G02B 2027/0178;
(Continued)

(56) References Cited

U.S. PATENT DOCUMENTS 5,797,668 A   8/1998  Kojima et al.
6,075,651 A   6/2000  Hoppe
(Continued)

FOREIGN PATENT DOCUMENTS

EP    1358765 A1    11/2003
FR    2690534 A1    10/1993
(Continued)

OTHER PUBLICATIONS

Facebook Technologies, LLC, Invitation to Pay Additional Fees, PCT/US2020/033688, dated Sep. 8, 2020, 16 pgs.
(Continued)

*Primary Examiner* — Nathanael R Briggs
*Assistant Examiner* — William D Peterson
(74) *Attorney, Agent, or Firm* — Morgan, Lewis & Bockius LLP

(57) ABSTRACT

A display assembly includes a light source, a spatial light modulator (SLM) and a grating. The light source is configured to emit illumination light, the SLM is configured to receive the illumination light and reflect at least a portion of the illumination light. The grating is positioned to redirect the illumination light output from the light source toward the SLM, receive at least a portion of the reflected light from the SLM, redirect first light having a first polarization toward the light source, and transmit through the grating second light having a second polarization that is orthogonal to the first polarization. Also disclosed are operations performed by the display assembly.

20 Claims, 9 Drawing Sheets

(51) Int. Cl.
  *G02F 1/1362* (2006.01)
  *G02F 1/1335* (2006.01)
  *G02F 1/13363* (2006.01)
  *G02B 27/28* (2006.01)

(52) U.S. Cl.
  CPC .... *G02F 1/13363* (2013.01); *G02F 1/133553* (2013.01); *G02F 1/136277* (2013.01); *G02B 2027/0118* (2013.01); *G02B 2027/0178* (2013.01); *G02F 1/133638* (2021.01); *G02F 2203/02* (2013.01); *G02F 2413/01* (2013.01); *G02F 2413/05* (2013.01)

(58) Field of Classification Search
  CPC .......... G02F 1/133553; G02F 1/13363; G02F 1/133638; G02F 2203/02
  USPC .......................................... 349/11
  See application file for complete search history.

(56) References Cited

U.S. PATENT DOCUMENTS

| | | | |
|---|---|---|---|
| 6,094,242 A | 7/2000 | Yamanaka | |
| 6,104,454 A | 8/2000 | Hiyama et al. | |
| 6,373,603 B1 | 4/2002 | Popovich et al. | |
| 6,563,638 B2 | 5/2003 | King et al. | |
| 6,829,095 B2 | 12/2004 | Amitai | |
| 7,175,332 B2 | 2/2007 | Tang | |
| 7,573,640 B2 | 8/2009 | Nivon et al. | |
| 7,946,708 B2 | 5/2011 | Sakata et al. | |
| 7,976,208 B2 | 7/2011 | Travis et al. | |
| 8,079,718 B1 | 12/2011 | Zhai et al. | |
| 8,305,690 B2 | 11/2012 | Ruhle et al. | |
| 8,570,656 B1 | 10/2013 | Weissman | |
| 8,698,713 B2 | 4/2014 | Hajjar et al. | |
| 8,724,206 B2 | 5/2014 | Spitzer et al. | |
| 8,941,559 B2 | 1/2015 | Bar-Zeev et al. | |
| 8,964,298 B2 | 2/2015 | Haddick et al. | |
| 9,087,471 B2 | 7/2015 | Miao | |
| 9,225,971 B2 | 12/2015 | Woodgate et al. | |
| 9,251,745 B2 | 2/2016 | Sprague | |
| 9,507,066 B2 | 11/2016 | Kollin et al. | |
| 9,519,084 B1 | 12/2016 | Thomas | |
| 9,557,568 B1 | 1/2017 | Ouderkirk et al. | |
| 10,095,036 B2 | 10/2018 | Carollo et al. | |
| 10,241,330 B2 | 3/2019 | Popovich et al. | |
| 10,274,805 B2 | 4/2019 | Tabirian et al. | |
| 10,353,210 B2 | 7/2019 | Wyrwas et al. | |
| 10,429,647 B2 | 10/2019 | Gollier et al. | |
| 10,495,798 B1 | 12/2019 | Peng et al. | |
| 10,578,873 B2 | 3/2020 | Lee et al. | |
| 10,634,907 B1 | 4/2020 | Geng et al. | |
| 10,663,745 B2 | 5/2020 | Ouderkirk et al. | |
| 10,976,551 B2 | 4/2021 | Cobb | |
| 10,996,466 B2 | 5/2021 | Amirsolaimani et al. | |
| 11,002,970 B2 | 5/2021 | Martinez et al. | |
| 11,022,803 B2 | 6/2021 | Lee | |
| 11,054,648 B2 | 7/2021 | Carollo et al. | |
| 11,067,810 B2 | 7/2021 | Yonekubo et al. | |
| 11,086,127 B2 | 8/2021 | Nishiyama et al. | |
| 11,269,123 B2 | 3/2022 | Sharp et al. | |
| 2004/0108971 A1 | 6/2004 | Waldern et al. | |
| 2004/0109208 A1 | 6/2004 | Amanai et al. | |
| 2005/0123229 A1 | 6/2005 | Huck et al. | |
| 2006/0221448 A1 | 10/2006 | Nivon et al. | |
| 2010/0053121 A1 | 3/2010 | Sprague | |
| 2010/0103078 A1 | 4/2010 | Mukawa et al. | |
| 2010/0302803 A1 | 12/2010 | Bita et al. | |
| 2011/0043142 A1 | 2/2011 | Travis et al. | |
| 2011/0096100 A1 | 4/2011 | Sprague | |
| 2011/0187293 A1 | 8/2011 | Travis | |
| 2012/0069031 A1 | 3/2012 | Bita et al. | |
| 2013/0101253 A1 | 4/2013 | Popovich et al. | |
| 2013/0201094 A1 | 8/2013 | Travis et al. | |
| 2013/0314793 A1 | 11/2013 | Robbins et al. | |
| 2014/0160543 A1 | 6/2014 | Putilin et al. | |
| 2014/0168034 A1 | 6/2014 | Luebke et al. | |
| 2014/0267875 A1 | 9/2014 | Gruhlke et al. | |
| 2014/0268879 A1 | 9/2014 | Mizuyama et al. | |
| 2015/0235460 A1 | 8/2015 | Schowengerdt et al. | |
| 2015/0378074 A1 | 12/2015 | Kollin et al. | |
| 2016/0026253 A1 | 1/2016 | Bradski et al. | |
| 2016/0033698 A1 | 2/2016 | Escuti et al. | |
| 2016/0209576 A1 | 7/2016 | Robinson et al. | |
| 2016/0363777 A1 | 12/2016 | Flynn et al. | |
| 2017/0016594 A1 | 1/2017 | Di Trapani et al. | |
| 2017/0068102 A1 | 3/2017 | Wong et al. | |
| 2017/0153454 A1 | 6/2017 | Callier et al. | |
| 2017/0255015 A1 | 9/2017 | Geng et al. | |
| 2017/0285347 A1 | 10/2017 | Cai et al. | |
| 2017/0293148 A1 | 10/2017 | Park et al. | |
| 2017/0336552 A1 | 11/2017 | Masuda et al. | |
| 2018/0029319 A1 | 2/2018 | Kalima et al. | |
| 2018/0088325 A1 | 3/2018 | Brown et al. | |
| 2018/0107007 A1 | 4/2018 | Wyrwas et al. | |
| 2018/0172988 A1 | 6/2018 | Ahmed et al. | |
| 2018/0180788 A1 | 6/2018 | Ambur et al. | |
| 2018/0239147 A1 | 8/2018 | Schowengerdt et al. | |
| 2018/0267222 A1 | 9/2018 | Ambur et al. | |
| 2018/0335629 A1 | 11/2018 | Cheng et al. | |
| 2018/0364482 A1 | 12/2018 | Georgiou et al. | |
| 2019/0018245 A1 | 1/2019 | Cheng et al. | |
| 2019/0018480 A1 | 1/2019 | Aleem et al. | |
| 2019/0018481 A1 | 1/2019 | Aleem et al. | |
| 2019/0025602 A1 | 1/2019 | Qin et al. | |
| 2019/0041642 A1 | 2/2019 | Haddick et al. | |
| 2019/0060602 A1 | 2/2019 | Tran et al. | |
| 2019/0072767 A1 | 3/2019 | Vallius et al. | |
| 2019/0094549 A1 | 3/2019 | Nicholson et al. | |
| 2019/0212573 A1 | 7/2019 | Popovich et al. | |
| 2019/0235235 A1 | 8/2019 | Ouderkirk et al. | |
| 2019/0265477 A1 | 8/2019 | Perreault et al. | |
| 2019/0353906 A1 | 11/2019 | Gollier et al. | |
| 2019/0369403 A1 | 12/2019 | Leister | |
| 2020/0050008 A1 | 2/2020 | Seo et al. | |
| 2020/0089002 A1 | 3/2020 | Lee | |
| 2020/0096816 A1 | 3/2020 | Lee et al. | |
| 2020/0124858 A1 | 4/2020 | Cakmakci | |
| 2020/0133005 A1 | 4/2020 | Yonekubo et al. | |
| 2020/0133017 A1 | 4/2020 | Ide | |
| 2020/0209667 A1* | 7/2020 | Sharlin | G02F 1/136277 |
| 2020/0249480 A1 | 8/2020 | Martinez et al. | |
| 2020/0310024 A1 | 10/2020 | Danziger et al. | |
| 2020/0310537 A1 | 10/2020 | Simmons | |
| 2020/0348530 A1 | 11/2020 | Xiao et al. | |
| 2020/0371280 A1 | 11/2020 | Geng et al. | |
| 2020/0371387 A1 | 11/2020 | Gollier et al. | |
| 2020/0371388 A1 | 11/2020 | Geng et al. | |
| 2020/0371389 A1 | 11/2020 | Geng et al. | |
| 2020/0379226 A1 | 12/2020 | Steiner et al. | |
| 2021/0072551 A1 | 3/2021 | Gollier et al. | |
| 2021/0080726 A1 | 3/2021 | Geng et al. | |
| 2021/0271082 A1 | 9/2021 | Smith et al. | |
| 2021/0278679 A1 | 9/2021 | Ouderkirk et al. | |
| 2021/0286183 A1 | 9/2021 | Ouderkirk et al. | |
| 2021/0294012 A1 | 9/2021 | Wong et al. | |

FOREIGN PATENT DOCUMENTS

| | | |
|---|---|---|
| GB | 2384059 A | 7/2003 |
| WO | WO2007/062098 A2 | 5/2007 |
| WO | 2018146326 A2 | 8/2018 |
| WO | 2018175649 A1 | 9/2018 |
| WO | WO2018/175653 A1 | 9/2018 |
| WO | WO-2018221867 A1 | 12/2018 |
| WO | 2019104046 A1 | 5/2019 |

OTHER PUBLICATIONS

Facebook Technologies, LLC, international Search Report and Written Opinion, PCT/US2020/033688, dated Oct. 29, 2020, 16 pgs.

(56) References Cited

OTHER PUBLICATIONS

Facebook Technologies, LLC, international Search Report and Written Opinion, PCT/US2020/033515, dated Aug. 17, 2020, 11 pgs.
Geng, Office Action, U.S. Appl. No. 15/930,318, dated Dec. 9, 2020, 9 pgs.
Geng, Office Action, U.S. Appl. No. 16/862,399, dated Dec. 16, 2020, 9 pgs.
Large M J et al., "Parallel Optics in Waveguide Displays: A Flat Panel Autostereoscopic Display," Journal of Display Technology, IEEE Service Center, New York NY, US, vol. 6, No. 10, Oct. 1, 2010 pp. 431-437, XPO11311965.
Moller C et al., "Flat Panel Time Multiplexed Autostereoscopic Display Using an Optical WedgeA Waveguide," IDW, 3D2-1, London UK, Jan. 1, 2004, pp. 1443-1446, XP007013996.
Aye T.M., et al., "Compact HMD Optics Based on Multiplexed Aberration-Compensated Holographic Optical Elements," Proceedings of SPIE, Event: Aerospace/Defense Sensing, Simulation, and Controls, Orlando, FL, Aug. 22, 2001, vol. 4361, pp. 88-97.
International Search Report and Written Opinion for International Application No. PCT/US2020/046576, dated Nov. 12, 2020, 9 Pages.
International Search Report and Written Opinion for International Application No. PCT/US2020/047281, dated Nov. 9, 2020, 9 Pages.
Margarinos., et al., "Wide Angle, Color, Hologrpahic Infinity Optics Display-Final Report," Farrand Optical Co., Valhalla, NY, Rort No. AFHRL-TR-80-53, Mar. 1981, 93 pages, retrieved from internet: URL: https://files.eric.ed.gov/fulltext/ED202467.pdf.
Geng, Final Office Action, U.S. Appl. No. 15/930,318, dated May 19, 2021, 12 pgs.
Geng, Office Action, U.S. Appl. No. 15/930,318, dated Sep. 3, 2021, 13 pgs.
Geng, Notice of Allowance, U.S. Appl. No. 15/930,318, dated Dec. 14, 2021, 11 pgs.
Geng, Notice of Allowance, U.S. Appl. No. 16/862,399, dated May 3, 2021, 7 pgs.
Geng, Notice of Allowance, U.S. Appl. No. 16/862,401, dated Mar. 31, 2021, 12 pgs.
Ex Parte Quayle Office action dated Dec. 1, 2020 for U.S. Appl. No. 16/810,417, filed Mar. 5, 2020, 9 pages.
Final Office Action dated Feb. 4, 2022 for U.S. Appl. No. 16/810,458, filed Mar. 5, 2020, 20 pages.
Final Office Action dated Nov. 15, 2021 for U.S. Appl. No. 16/810,431, filed Mar. 5, 2020, 14 pages.
Final Office Action dated Oct. 25, 2021 for U.S. Appl. No. 16/810,494, filed Mar. 5, 2020, 11 pages.
International Search Report and Written Opinion for International Application No. PCT/US2020/050776, dated Mar. 15, 2021, 23 Pages.
International Search Report and Written Opinion for International Application No. PCT/US2020/050782, dated Mar. 9, 2021, 16 Pages.
International Search Report and Written Opinion for International Application No. PCT/US2021/013968, dated Jun. 30, 2021, 13 pages.
Invitation to Pay Additional Fees for International Application No. PCT/US2021/013968, dated May 7, 2021, 9 pages.
Larussa J.A., et al., "The Holographic Pancake Window," Proceedings of SPIE 1978, Event: 22nd Annual Technical Symposium, San Diego, 1978, 11 pages.
Moon S., et al., "Layered Display with Accommodation Cue Using Scattering Polarizers," IEEE Journal of Selected Topics in Signal Processing, IEEE, US, Oct. 23, 2017, vol. 11 (7), pp. 1223-1231.
Non-Final Office Action dated Feb. 2, 2022 for U.S. Appl. No. 17/241,921, filed Apr. 27, 2021, 7 pages.
Non-Final Office Action dated Sep. 3, 2021 for U.S. Appl. No. 16/810,471, filed Mar. 5, 2020, 21 pages.
Non-Final Office Action dated Oct. 26, 2020 for U.S. Appl. No. 16/810,445, filed Mar. 5, 2020, 11 pages.
Non-Final Office Action dated Oct. 7, 2021 for U.S. Appl. No. 16/782,604, filed Feb. 5, 2020, 17 Pages.
Non-Final Office Action dated Oct. 7, 2021 for U.S. Appl. No. 16/784,718, filed Feb. 7, 2020, 14 Pages.
Non-Final Office Action dated Apr. 27, 2021 for U.S. Appl. No. 16/810,494, filed Mar. 5, 2020, 11 Pages.
Non-Final Office Action dated Jul. 29, 2021 for U.S. Appl. No. 16/810,431, filed Mar. 5, 2020, 12 Pages.
Notice of Allowance dated Jan. 12, 2021 for U.S. Appl. No. 16/810,417, filed Mar. 5, 2020, 6 pages.
Notice of Allowance dated Mar. 19, 2021 for U.S. Appl. No. 16/810,485, filed Mar. 5, 2020, 12 pages.
Notice of Allowance dated Jan. 27, 2021 for U.S. Appl. No. 16/810,445, filed Mar. 5, 2020, 9 pages.
Notice of Allowance dated Jan. 31, 2022 for U.S. Appl. No. 16/810,494, filed Mar. 5, 2020, 8 pages.
International Preliminary Report on Patentability for International Application No. PCT/US2020/046576, dated Mar. 24, 2022, 8 pages.
International Preliminary Report on Patentability for International Application No. PCT/US2020/047281, dated Mar. 24, 2022, 8 pages.
International Preliminary Report on Patentability for International Application No. PCT/US2020/050776, dated Mar. 31, 2022, 18 pages.
International Preliminary Report on Patentability for International Application No. PCT/US2020/050782, dated Mar. 31, 2022, 12 pages.
Non—Final Office Action dated Mar. 23, 2022 for U.S. Appl. No. 16/848,652, filed Apr. 14, 2020, 13 pages.
Non-Final Office Action dated Feb. 9, 2022 for U.S. Appl. No. 16/532,311, filed Aug. 5, 2019, 10 pages.
Non-Final Office Action dated Mar. 30, 2022 for U.S. Appl. No. 16/734,163, filed Jan. 3, 2020, 14 pages.
Notice of Allowance dated Feb. 8, 2022 for U.S. Appl. No. 16/782,604, filed Feb. 5, 2020, 9 pages.
Notice of Allowance dated Feb. 8, 2022 for U.S. Appl. No. 16/784,718, filed Feb. 7, 2020, 9 pages.
Notice of Allowance dated Feb. 28, 2022 for U.S. Appl. No. 16/810,494, filed Mar. 5, 2020, 5 pages.
Notice of Allowance dated Mar. 29, 2022 for U.S. Appl. No. 16/810,494, filed Mar. 5, 2020, 5 pages.
Final Office Action dated Apr. 21, 2022 for U.S. Appl. No. 16/810,471, filed Mar. 5, 2020, 24 pages.
Notice of Allowance dated May 12, 2022 for U.S. Appl. No. 17/241,921, filed Apr. 27, 2021, 7 pages.
Notice of Allowance dated Apr. 15, 2022 for U.S. Appl. No. 16/810,431, filed Mar. 5, 2020, 10 pages.
Notice of Allowance dated May 24, 2022 for U.S. Appl. No. 16/734,167, filed Jan. 3, 2020, 8 pages.
Notice of Allowance dated Apr. 26, 2022 for U.S. Appl. No. 16/810,431, filed Mar. 5, 2020, 04 pages.
Geng, Office Action, U.S. Appl. No. 16/862,403, dated May 25, 2022, 29 pgs.
Gollier, Office Action, U.S. Appl. No. 16/862,396, dated Apr. 18, 2022, 16 pgs.
Peng, Office Action, U.S. Appl. No. 16/734,163, dated Mar. 30, 2022, 14 pgs.
Sulai, Office Action, U.S. Appl. No. 16/810,471, dated Apr. 21, 2022, 24 pgs.

* cited by examiner

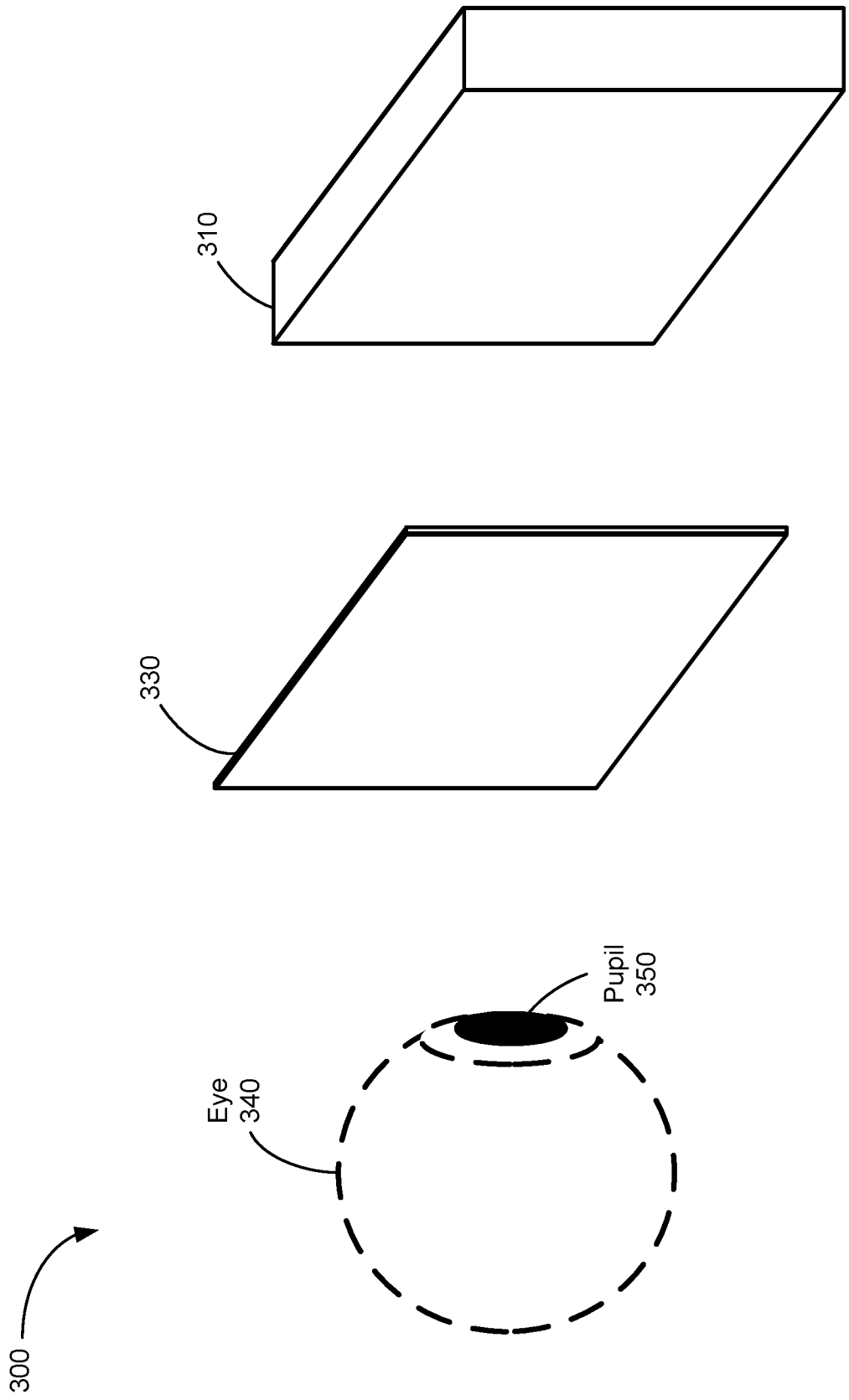

500 ⤵

(A)
↓

550 Receive the first light and the second light at the grating.

↓

560 Direct, with the grating, the first light toward a first direction and direct, with the grating, the second light toward a second direction that is different from the first direction.

> 562 Each of the first direction and the second direction is determined at least in part by the refractive index of the transparent optical element and the angle between the first surface of the transparent optical element and the surface of the reflective spatial light modulator.

> 564 The first direction corresponds to a first diffraction order of the grating and the second direction corresponds to a zeroth diffraction order of the grating.

↓

566 Receive the second light transmitted through the grating at a polarizer, and transmit the second light having the second polarization through the polarizer.

↓

568 Receive the second light at an output assembly.

Figure 5B

DISPLAY ILLUMINATION USING A GRATING

RELATED APPLICATIONS

This application claims the benefit of, and priority to, U.S. Provisional Patent Application Ser. No. 62/898,450, filed Sep. 10, 2019, which is incorporated by reference herein in its entirety. This application is related to U.S. patent application Ser. No. 16/734,163 entitled "Switchable Polarization Retarder Array for Active Zonal Illumination of Display" filed Jan. 3, 2020 and U.S. patent application Ser. No. 16/734,167 entitled "Display with Switchable Retarder Array" filed Jan. 3, 2020, each of which is hereby incorporated by reference in its entirety.

TECHNICAL FIELD

This relates generally to display devices, and more specifically to illuminators for use in head-mounted display devices.

BACKGROUND

Head-mounted display devices (also called herein head-mounted displays) are gaining popularity as means for providing visual information to a user. For example, the head-mounted display devices are used for virtual reality and augmented reality operations.

Light, compact, and energy-efficient displays are desired in head-mounted display devices in order to improve a user experience with virtual reality and augmented reality operations. Additionally, uniform illumination light is desired in order to provide users with high quality images.

SUMMARY

Accordingly, there is a need for compact and lightweight head-mounted display devices with high quality images. Such head-mounted display devices will enhance user experience with virtual reality and/or augmented reality operations.

The above deficiencies and other problems associated with conventional head-mounted displays are reduced or eliminated by the disclosed optical components and display devices.

In accordance with some embodiments, a display assembly includes a light source, a reflective spatial light modulator, and a grating. The light source is configured to emit illumination light. The reflective spatial light modulator is configured to receive the illumination light and reflect at least a portion of the illumination light. The grating is positioned to redirect the illumination light output from the light source toward the reflective spatial light modulator, receive at least a portion of the reflected light from the reflective spatial light modulator, redirect first light having a first polarization toward the light source, and transmit second light having a second polarization through the grating. The second polarization is orthogonal to the first polarization.

In accordance with some embodiments, a method includes receiving illumination light at a grating and redirecting, with the grating, the illumination light toward a reflective spatial light modulator. In some embodiments, the illumination light has a first polarization. The method also includes receiving the illumination light redirected by the grating at the reflective spatial light modulator and providing, by the reflective spatial light modulator, first light having first polarization and second light having a second polarization that is orthogonal to the first polarization. The method further includes receiving the first light and the second light at the grating; directing, with the grating, the first light toward a first direction; and directing the second light toward a second direction that is different from the first direction.

Thus, the disclosed embodiments provide lightweight and compact display devices that provide uniform illumination and high quality images. In some embodiments, the display devices are head-mounted display devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIGS. 5A-5B illustrate a flow diagram illustrating a method of using a grating in accordance with some embodiments.

Figure 1:
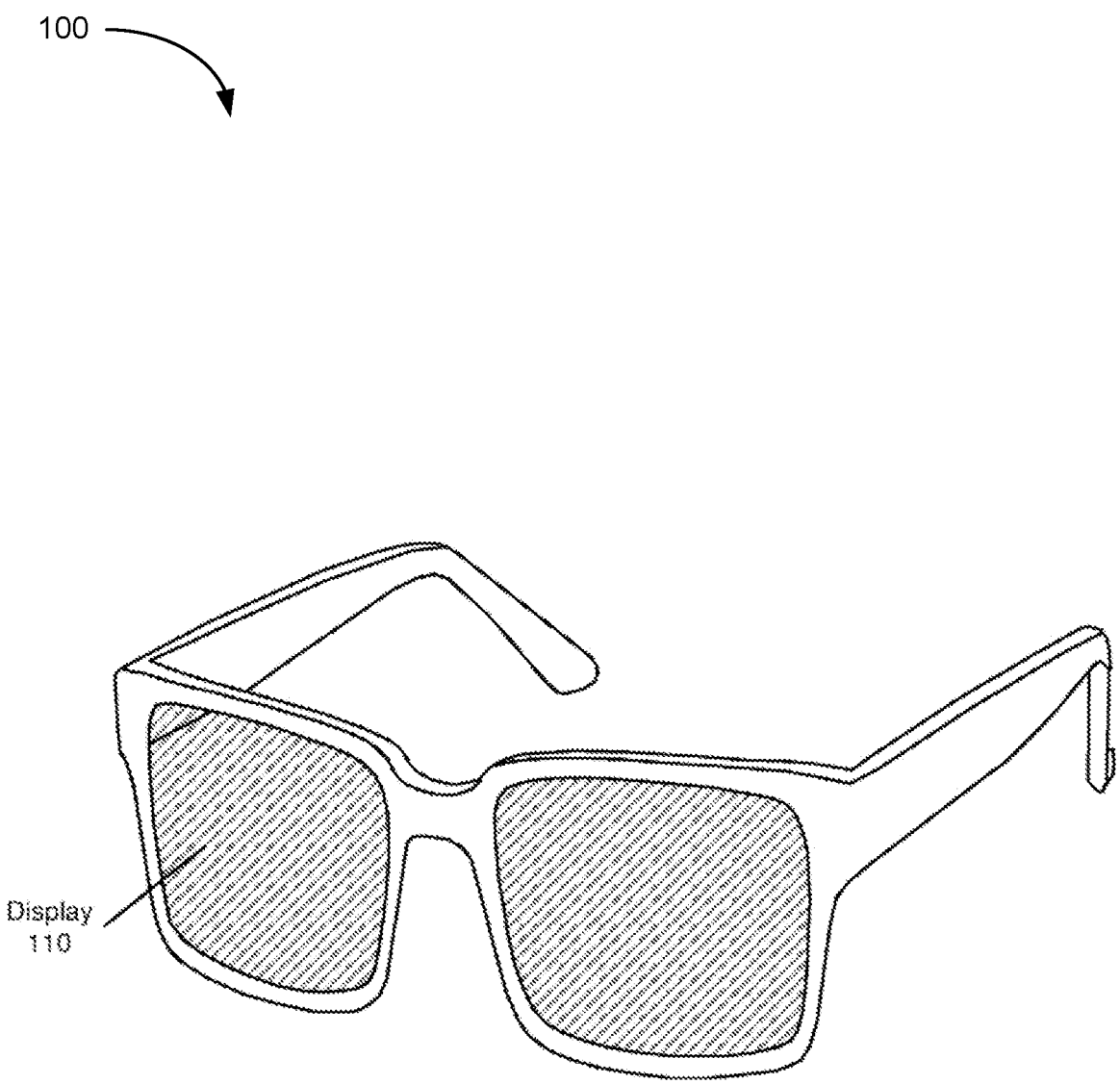
FIG. 1 is a perspective view of a display device in accordance with some embodiments.

These figures are not drawn to scale unless indicated otherwise.

DETAILED DESCRIPTION

There is a need for head-mounted display devices that are lightweight, compact, and can provide uniform illumination.

The present disclosure provides display devices that include a grating configured to direct illumination light emitted from a light source toward a reflective spatial light modulator and selectively direct light output from the reflective spatial light modulator for delivery to a user's eye. Such display devices have a compact footprint, thereby enabling reduction of the size and weight of display devices. In addition, such display devices provide uniform illumination, thereby improving the image quality when a reflective display element (e.g., a reflective spatial light modulator) is used.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first reflector could be termed a second reflector, and, similarly, a second reflector could be termed a first reflector, without departing from the scope of the various described embodiments. The first reflector and the second reflector are both light reflectors, but they are not the same reflector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
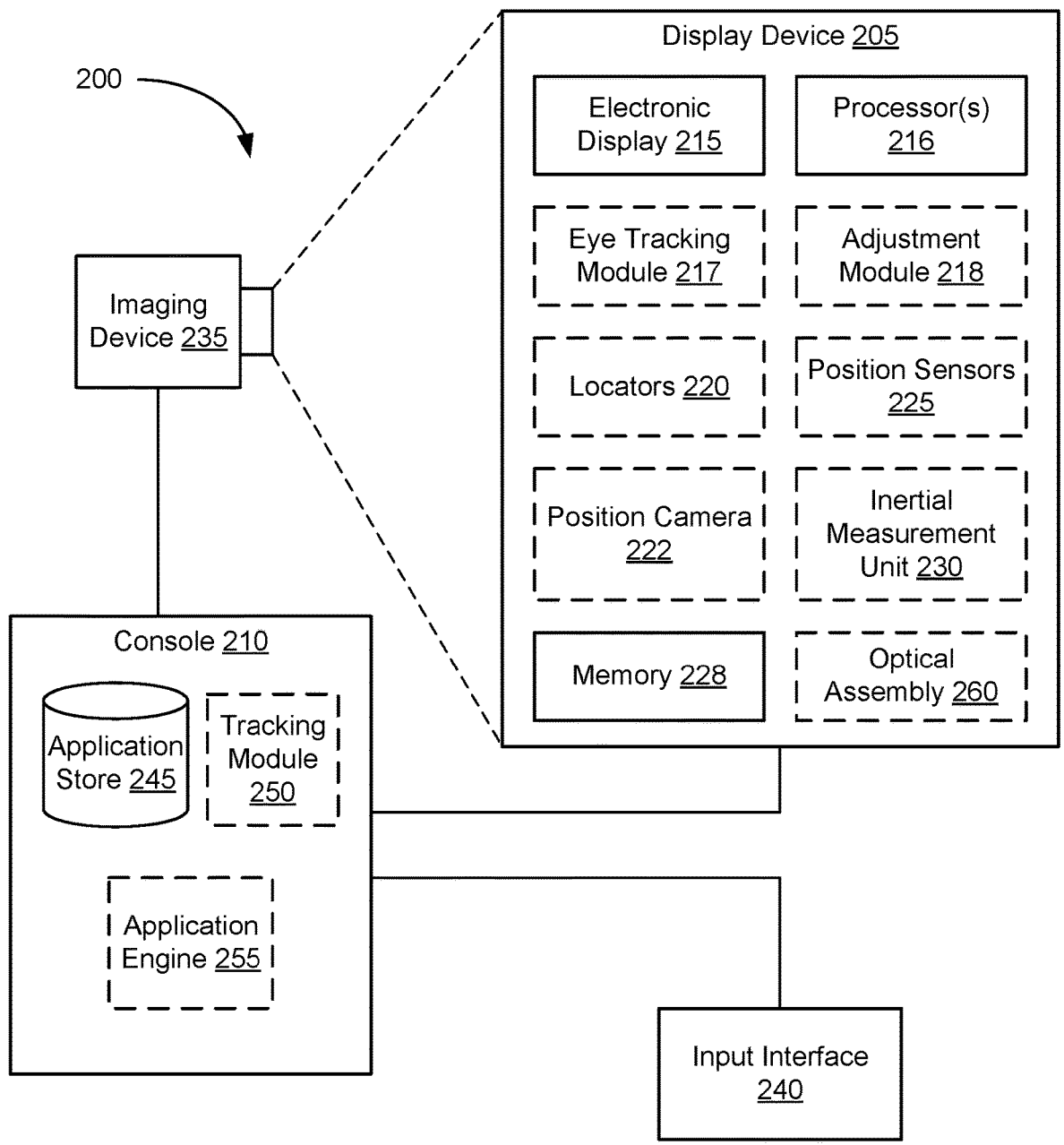
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 corresponds to display device 100 and is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox and ultimately to the back of the user's retina(s). An eyebox is a region that is occupied by an eye of a user of display device 205 (e.g., a user wearing display device 205) who is viewing images from display device 205. In some cases, the eyebox is represented as a 10 mm×10 mm square. In some embodiments, the one or more optical components include one or more coatings, such as anti-reflective coatings, and one or more polarization volume holograms (PVH).

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Additionally or alternatively, the reflection off of the surfaces of the eye is used to also determine location of the pupil. In some cases, the IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps the received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR eye tracking system described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to provide image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260. In some embodiments, display device 205 optionally includes a single optical assembly 260 or multiple optical assemblies 260 (e.g., an optical assembly 260 for each eye of a user). In some embodiments, the one or more optical assemblies 260 receive image light for the computer generated images from the electronic display device(s) 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display device 215 projects computer-generated images to one or more reflective elements (not shown), and the one or more optical assemblies receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of OLEDs, or some combination thereof.

In some embodiments, light emission device 310 includes an emission intensity array (e.g., a spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device 310 including an emission intensity array make up a display element. Alternatively, the display element includes light emission device 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light so that the light output by the display element is refracted by one or more lenses toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device 310.

In some embodiments, display device 300 (or light emission device 310 of display device 300) includes a reflective spatial light modulator, such as a Liquid Crystal on Silicon (LCoS) spatial light modulator. In some embodiments, the LCoS spatial light modulator includes liquid crystals. In some embodiments, the LCoS spatial light modulator includes ferroelectric liquid crystals. The reflective spatial light modulator has an array of pixels (or subpixels), and a respective pixel (or a respective subpixel) is individually controlled to reflect light impinging thereon (e.g., a pixel is activated to reflect light impinging thereon or deactivated to cease reflecting the light impinging thereon) or modulate the reflected light (e.g., a pixel is activated to change the polarization of the reflected light or deactivated to cease changing the polarization of the reflected light, or vice versa). In some embodiments, display device 300 includes multiple reflective spatial light modulators (e.g., a first reflective spatial light modulator for a first color, such as red, a second reflective spatial light modulator for a second color, such as green, and a third reflective spatial light modulator for a third color, such as blue). Such reflective spatial light modulator requires an illuminator that provides light to the reflective spatial light modulator.

Conventional illuminators (e.g., conventional LCoS illuminators) use a single polarizing beam splitter (PBS), which has a height that corresponds to a width of the reflective spatial light modulator (e.g., an LCoS spatial light modulator), for illuminating the LCoS spatial light modulators. This increases the required volume of the illuminator. In addition, as the LCoS spatial light modulator typically reflects a portion of illumination light to provide image light, non-uniformity in the illumination light will lead to non-uniformity in the image light. Thus, there is a need for compact illuminators that can provide uniform illumination of LCoS spatial light modulators.

Figure 4A:
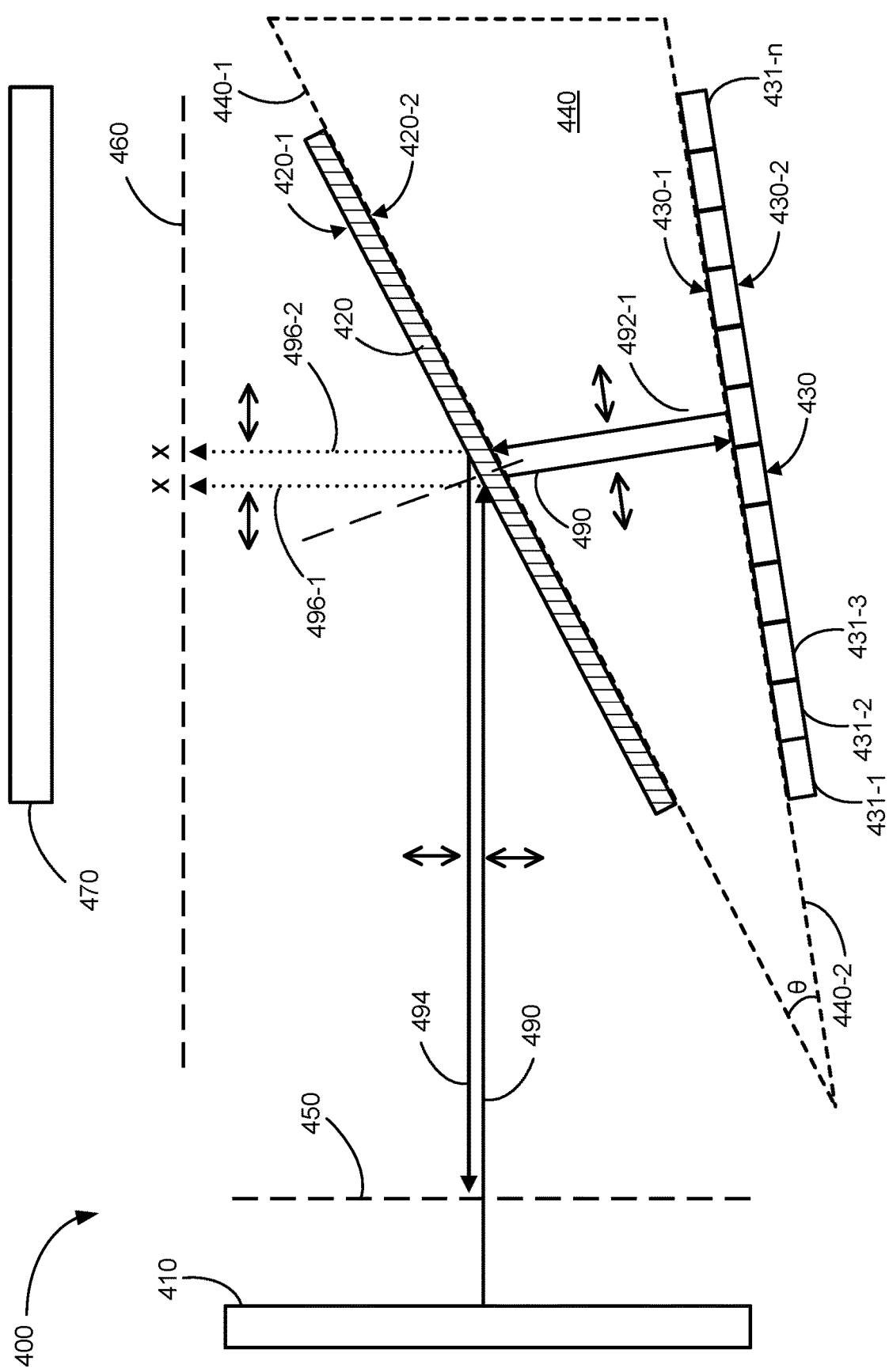
FIGS. 4A-4B are schematic diagrams illustrating a display assembly in accordance with some embodiments.
Figure 4B:
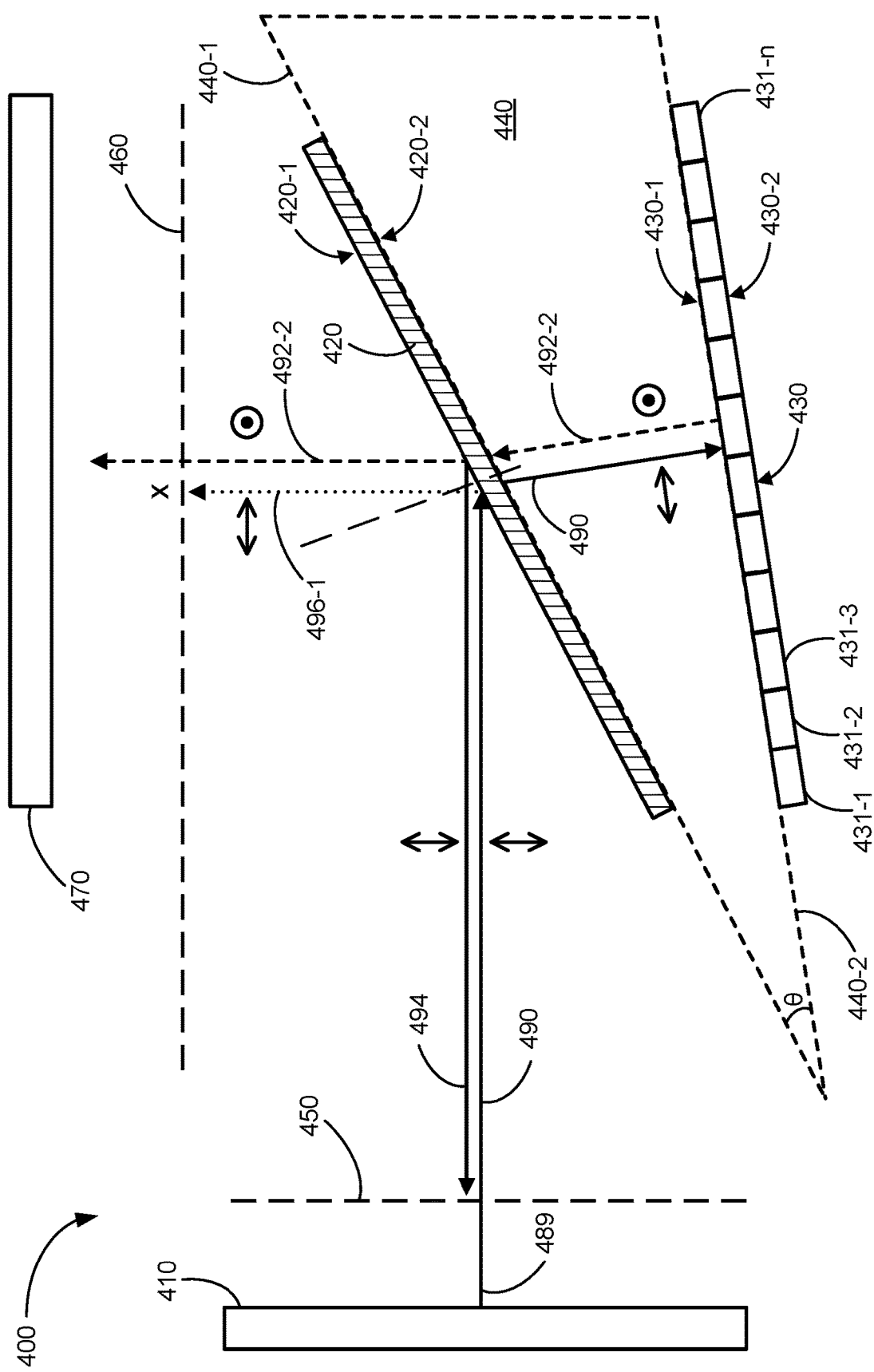

FIGS. 4A and 4B are schematic diagrams illustrating a display assembly 400 in accordance with some embodiments. Display assembly 400 enables compact illumination, while improving uniformity in illumination light. Display assembly 400 includes a reflective spatial light modulator 430, such as an LCoS spatial light modulator, and optical devices used to illuminate the reflective spatial light modulator. In some embodiments, the reflective spatial light modulator is integrated with such optical device.

As shown, display assembly 400 also includes a light source 410 and a grating 420. The grating 420 is positioned so that a surface 420-1 or 420-2 (e.g., an optical surface 420-1 or 420-2) of the grating 420 forms an angle θ with respect to a surface 430-1 or 430-2 of the reflective spatial light modulator 430 (e.g., a surface 420-1 or 420-2 of the grating 420 is non-parallel and non-perpendicular with respect to a surface 430-1 or 430-2 of the reflective spatial light modulator 430). The light source 410 is configured (e.g., positioned) to output illumination light 490 toward the grating 420. In some embodiments, the grating 420 is a polarization-dependent grating. The grating 420 is configured (e.g., positioned) to receive illumination light 490 having a first polarization (e.g., a first linear polarization, such as s-polarization) and to redirect (e.g., diffract) the illumination light 490 light having the first polarization toward the reflective spatial light modulator 430. The reflective spatial light modulator 430 includes a plurality of pixels 431-1, 431-2, 431-3, . . . , 431-n, referred to individually or collectively as pixel 431. A respective pixel 431 of the plurality of pixels is configured to receive the illumination light 490, which has a first polarization, and provide: (i) first light 492-1 having the first polarization while the respective pixel 431 is in a first state (shown in FIG. 4A) and (ii) second light 492-2 having a second polarization (e.g., a second linear polarization, such as p-polarization) while the respective pixel 431 is in a second state that is different from the first state (shown in FIG. 4B). For example, the respective pixel 431 may provide the first light having the same polarization (e.g., the first polarization) as the illumination light while the respective pixel 431 is deactivated (e.g., turned off) and provide the second light having a polarization different from (e.g., orthogonal to) the polarization of the illumination light while the respective pixel 431 is activated (e.g., turned on). Alternatively, the respective pixel 431 may provide the first light having the same polarization as the illumination light while the respective pixel 431 is activated (e.g., turned on), and provide the second light having a polarization different from the polarization of the illumination light while the respective pixel 431 is deactivated (e.g., turned off). In some embodiments, the second polarization is orthogonal to the first polarization. The grating 420 is further configured to receive the first light 492-1 (shown in FIG. 4A) or the second light 492-2 (shown in FIG. 4B) output from the reflective spatial light modulator 430. The grating 420 is configured to redirect (e.g., diffract) the first light 492-1 having the first polarization toward the light source 410 (shown in FIG. 4A as light 494) and to transmit (e.g., to a zeroth order diffraction direction of the grating 420) the second light 492-2 having the second polarization (shown in FIG. 4B as light 496-2). In some embodiments, the grating 420 is configured to redirect light having the first polarization, including the at least a portion of illumination light 490 (e.g., via zeroth order reflection) as light 496-1 and at least a portion of the first light 492-1 (e.g., via zeroth order transmission) as the light 496-2, toward a same first diffraction order direction of the grating 420. In some embodiments, the grating 420 is configured to transmit or redirect (e.g., diffract) light without changing a polarization of the transmitted or redirected (e.g., diffracted) light.

As shown in FIGS. 4A-4B, display assembly 400 allows physical separation of light having different polarizations, which, in turn, improves the extinction ratio of display assembly 400.

In some embodiments, the grating 420 is an isotropic grating that includes an isotropic material.

In some embodiments, display assembly 400 further includes an output assembly 470 configured to direct the second light 492-2 (e.g., propagate light via total internal reflection) toward an eye 340 of a user. In such cases, the second light 492-2 is transmitted through the grating 420 toward the output assembly. In some embodiments, the output assembly 470 includes a waveguide and an in-coupler so that at least a portion of the second light 492-2 is coupled into the waveguide.

In some embodiments, display assembly 400 further includes a transparent optical element 440 (e.g., prism) that has a first surface 440-1 and a second surface 440-2. The second surface 440-2 is non-parallel to the first surface 440-1. In some embodiments, the second surface 440-2 is parallel to a surface of the reflective spatial light modulator 430. The grating 420 is disposed on the first surface 440-1 of the transparent optical element 440. As shown in FIG. 4A, the transparent optical element 440 is disposed between the grating 420 and the reflective spatial light modulator 430, and transparent optical element 440 has a refractive index that is different from the refractive index of air. In some embodiments, the refractive index of the transparent optical element 440 in combination with the angle θ between a surface 420-1 (or surface 420-2) of the grating 420 and a surface 430-1 (or surface 430-2) of the reflective spatial light modulator 430 determines the first and second directions (e.g., the directions of the first diffraction order and the zeroth diffraction order, respectively). For example, as shown in FIG. 4B, the second light 492-2 is transmitted through the grating 420 into the direction of the zeroth order diffraction and is further refracted at the first surface 440-1 of the transparent optical element 440 based on the refractive index of the transparent optical element 440 and the incident angle of the second light 492-2 onto the first surface 440-1.

In some embodiments, display assembly 400 further includes a polarizer 450 (e.g., an absorptive polarizer) that is disposed between the light source 410 and the grating 420. For example, the light source 410 may output initial light 489 toward the polarizer 450. The initial light 489 may include light having the first polarization as well as light having other polarizations that are different from the first polarization (e.g., light having a polarization that is orthogonal to the first polarization). In some cases, the initial light 489 may be unpolarized. The polarizer 450 is configured to transmit light having the first polarization and block transmission of light having the second polarization. Thus, the polarizer 450, when included in display assembly 400, ensures that illumination light 490, received by the grating 420, has substantially the first polarization (e.g., a light source that provides initial light 489 having random polarization may be used in conjunction with the polarizer 450 so that only light having the first polarization is provided to the grating 420).

In some embodiments, the polarizer 450 is a reflective polarizer.

In some embodiments, display assembly 400 further includes a polarizer 460. In some embodiments, the polarizer 460 is disposed between the grating 420 and the output assembly 470 when the output assembly 470 is included. The polarizer 460 is configured to transmit light having the second polarization and block transmission of light having the first polarization. Thus, as shown in Figured 4B, the second light 492-2 having the second polarization is transmitted through the polarizer 460. Additionally, as shown in FIG. 4A, any portion of the first light 492-1, having the first polarization, that may not be successfully directed by the grating 420 (e.g., zeroth order leakage, such as light 496-1, which corresponds to the zeroth order reflection of the illumination light 490, and light 496-2, which corresponds to the zeroth order transmission of the first light 492-1 having the first polarization), is blocked by polarizer 460 from being transmitted towards the output assembly (when included). The polarizer 460 may be any of: a reflective polarizer (e.g., an optical element that reflects light having the first polarization and transmits light having the second polarization) or an absorptive polarizer (e.g., an optical element that absorbs light having the first polarization and transmits light having the second polarization).

Figure 4C:
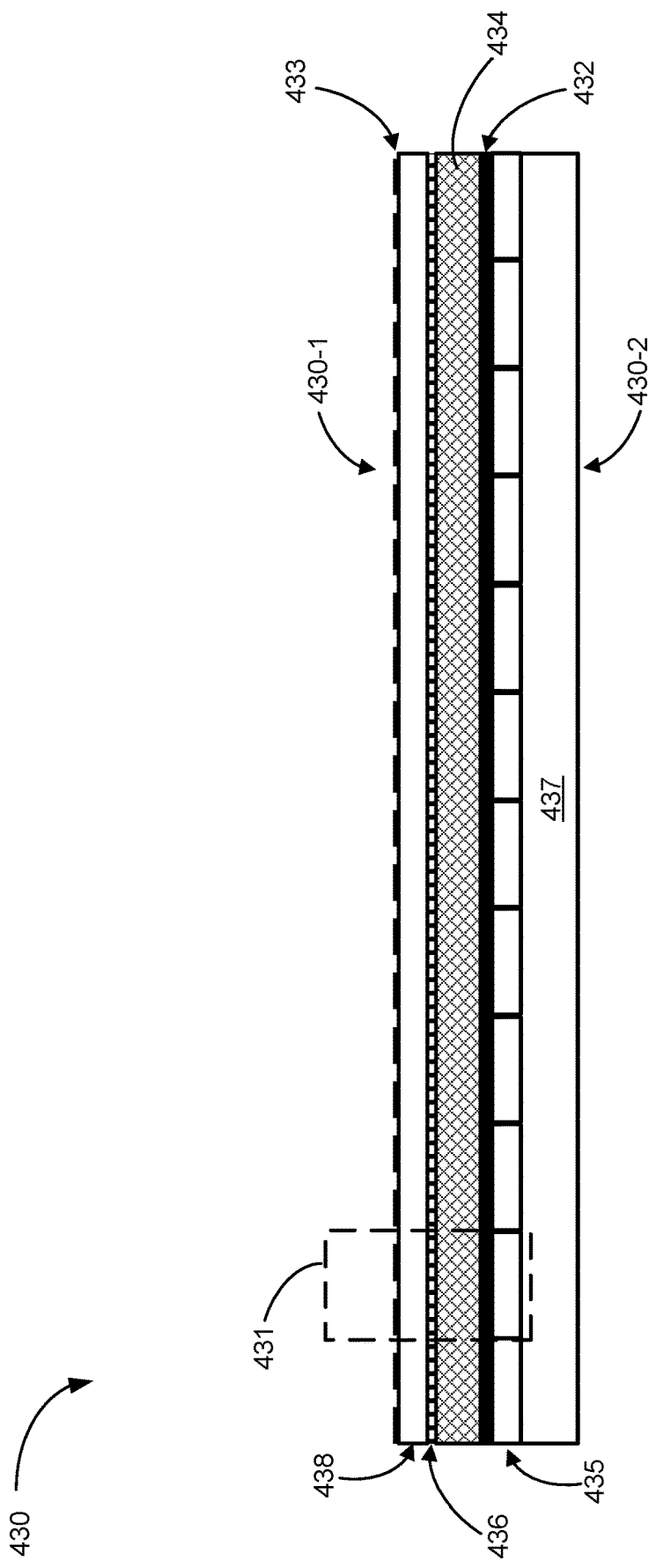
FIGS. 4C-4D are schematic diagrams illustrating a reflective spatial light modulator in accordance with some embodiments.
Figure 4D:
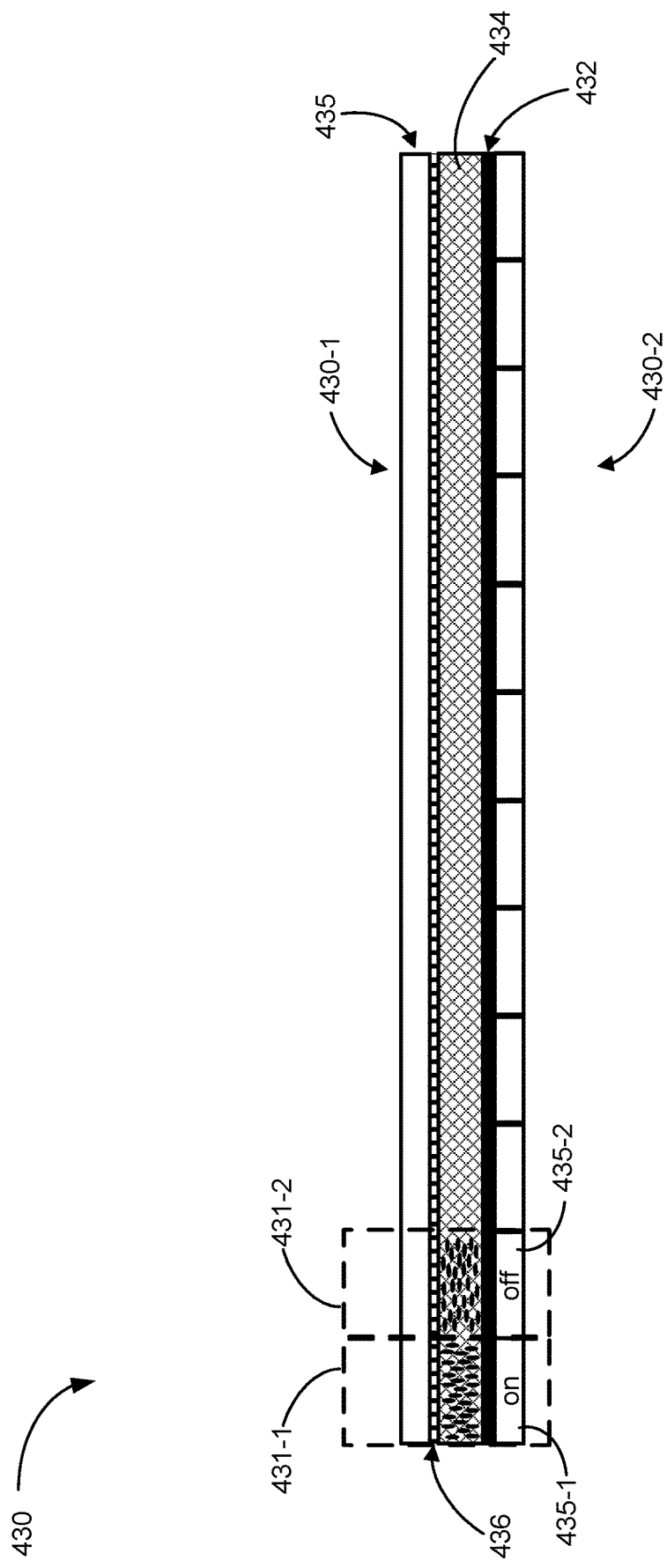

FIGS. 4C and 4D are schematic diagram illustrating a reflective spatial light modulator 430 in accordance with some embodiments. In some embodiments, as shown in FIG. 4C, the reflective spatial light modulator 430 includes a reflective surface 432 (e.g., a mirror or a reflector, such as a full reflector), an optical retarder 433 (e.g., quarter wave plate), and a layer of optically anisotropic molecules 434 (e.g., liquid crystals) that are disposed between the reflective surface 432 and the optical retarder 433. Additionally, the reflective spatial light modulator 430 may include one or more transistors 435 and an optically transparent electrode 438 so that an electric field applied to a respective portion of the layer of optically anisotropic molecules 434 can be individually controlled. In some embodiments, the one or more transistors 435 are integrated with a substrate 437 that may include a silicon substrate and/or a printed circuit board (PCB). In some embodiments, the one or more transistors may be a metal-oxide-semiconductor field-effect transistor (e.g., MOSFET). In some embodiments, the transistors are arranged in a complementary metal-oxide-semiconductor (e.g., CMOS) configuration.

The layer of optically anisotropic molecules 434 is disposed between the optically transparent electrode 438 and the one or more transistors 435. Each transistor of the one or more transistors 435 defines a pixel 431 and a respective transistor 435 is configured to control a state of a respective pixel 431. This configuration allows polarization modulation. For example, the respective pixel 431 of the plurality of pixels may provide the first light having the same polarization as the illumination light while the respective pixel 431 (or a corresponding transistor 435) is in the first state and provide the second light having a polarization different from (e.g., orthogonal to) the polarization of the illumination light while the respective pixel 431 (or the corresponding transistor 435) is the second state. Thus, in some embodiments, a respective pixel 431 of the plurality of pixels is individually activatable. For example, the respective pixel 431 of the plurality of pixels may be activated or deactivated independent of whether the rest of the plurality of pixels are activated or deactivated. Similarly, a respective transistor of the plurality of transistors 435 may be individually activatable.

In some embodiments, an electrical signal applied at each pixel 431 is individually controllable via the one or more transistors 435. For example, a respective pixel 431 is in the first state when a respective transistor 435 allows an electrical signal to be applied at a respective pixel 431 so that optically anisotropic molecules in a portion of the layer of optically anisotropic molecules that are located adjacent to the respective transistor 435 have a first orientation, and the respective pixel 431 is in the second state when the respective transistor 435 does not allow an electrical signal to reach the respective pixel 431 so that the optically anisotropic molecules in the portion of the layer of optically anisotropic molecules that are located adjacent to the respective transistor 435 have a second orientation that is different from the first orientation, or vice versa. For example, as shown in FIG. 4D, a first pixel 431-1 is in a first state and the second pixel 431-2 is in the second state. An electrical signal is applied (e.g., "on") at the first pixel 431-1, and optically anisotropic molecules (e.g., liquid crystals) that are in a first portion of the layer of optically anisotropic molecules, located adjacent to a first transistor 435-1 and corresponding to the first pixel 431-1, have a first orientation. An electrical signal is not applied (e.g., "off") at a second pixel 431-2, and optically anisotropic molecules that are in a second portion of the layer of optically anisotropic molecules, located adjacent to a second transistor 435-2 and corresponding to the second pixel 431-2, have a second orientation that is different from (in some cases, orthogonal to), the first orientation. In some embodiments, the first transistor 435-1 may be connected to a different electrical source (e.g., voltage or current source) than the second transistor 435-2. Alternatively, the first transistor 435-1 and the second transistor 435-2 may be connected in parallel to a same electrical source. Substrate 437 and optical retarder 433 are not shown in FIG. 4D so as not to obscure other aspects of the reflective spatial light modulator 430.

In some embodiments, the reflective spatial light modulator 430 also includes an alignment layer 436 disposed adjacent to the layer of optically anisotropic molecules 434 (e.g., liquid crystals). In some embodiments, the layer of optically anisotropic molecules 434 is disposed between the one or more transistors 435 and the alignment layer 436. In some embodiments, the layer of optically anisotropic molecules 434 is in contact with the alignment layer 436.

Figure 5A:
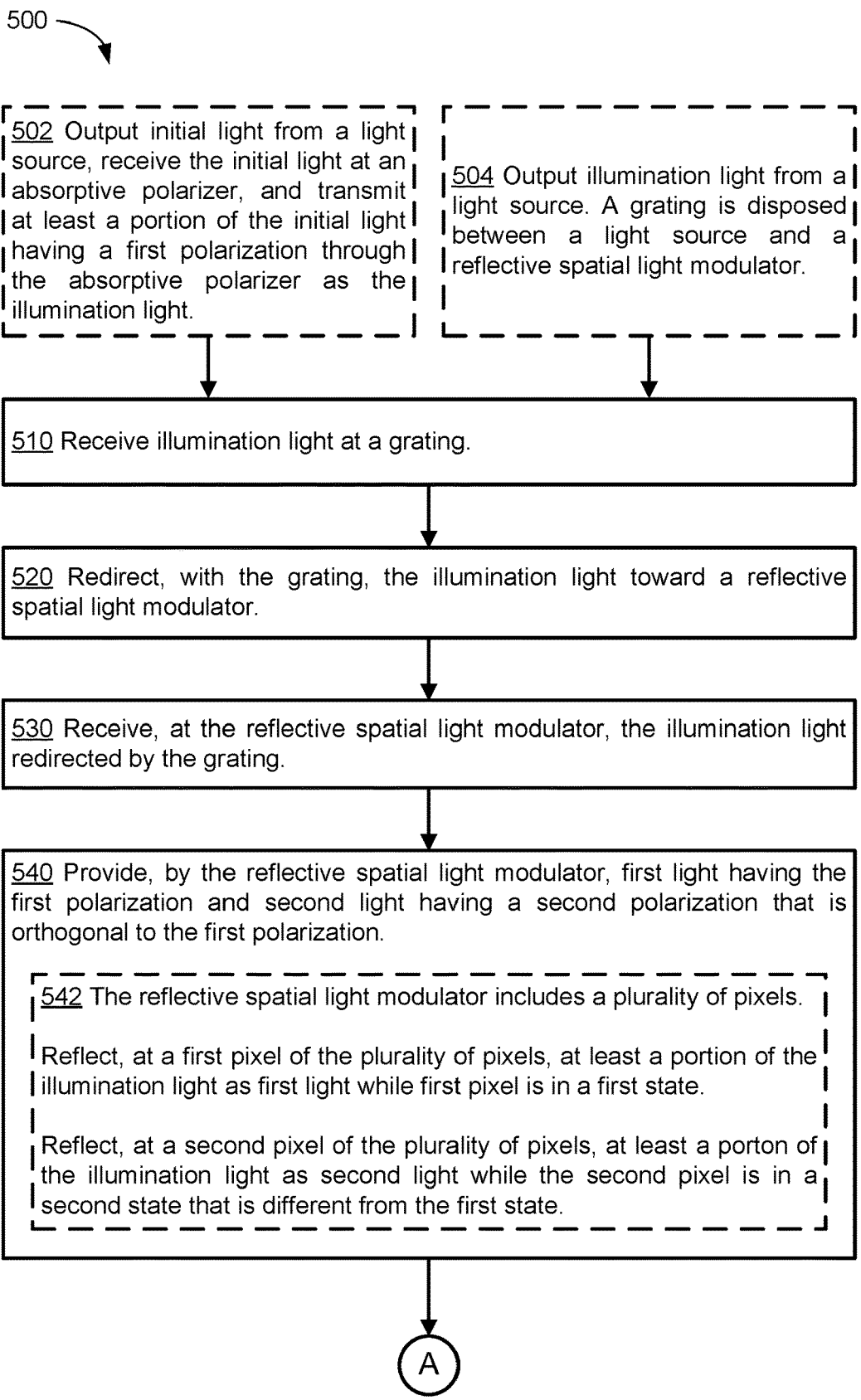

FIGS. 5A-5B illustrate a flow diagram illustrating a method 500 in accordance with some embodiments. The method 500 includes (operation 510) receiving illumination light 490 at a grating 420 and (operation 520) redirecting (e.g., diffracting), with the grating 420, the illumination light 490 toward a reflective spatial light modulator 430 that includes a plurality of pixels 431. In some embodiments, the illumination light 490 has a first polarization. The method 500 also includes (operation 530) receiving, at the reflective spatial light modulator 430, the illumination light 490 redirected by the grating 420. The method 500 further includes (operation 540) providing, by the reflective spatial light modulator 430, first light 492-1 having a first polarization and second light 492-2 having a second polarization that is orthogonal to the first polarization. The method 500 further includes (operation 550) receiving the first light 492-1 and the second light 492-2 at the grating 420 and (operation 560) directing, with the grating 420, the first light 492-1 toward a first direction and directing, with the grating 420, the second light 492-2 toward a second direction that is different from the first direction.

In some embodiments, the method 500 includes (operation 502) outputting initial light (e.g., initial light 489) from a light source 410; receiving the initial light at an absorptive polarizer (e.g., polarizer 450); and transmitting, through the absorptive polarizer (e.g., polarizer 450), at least a portion of the initial light having the first polarization as the illumination light 490.

In some embodiments, the method 500 includes (operation 504) outputting the illumination light 490 from a light source 410 and the grating 420 is disposed between the light source 410 and the reflective spatial light modulator 430.

In some embodiments, the reflective spatial light modulator 430 includes a plurality of pixels 431. In such cases, providing the first light 492-1 includes (operation 542) reflecting, at a first pixel of the plurality of pixels 431, at least a portion of the illumination light 490 as the first light 492-1 while the first pixel is in a first state; and providing the second light 492-2 includes reflecting, at a second pixel of the plurality of pixels 431, at least a portion of the illumination light 490 as the second light 492-2 while the second pixel is in a second state that is different from the first state. FIG. 4A shows a pixel (e.g., pixel 431-7) providing the first light 492-1 and FIG. 4B shows the same pixel (e.g., pixel 431-7) providing the second light 492-2. Because each pixel 431 of the plurality of pixels is individually activatable, the first pixel may be deactivated to provide the first light 492-1 and a second pixel different from the first pixel may be activated to provide the second light 492-2 (or vice versa).

In some embodiments, each of the first direction and the second direction is determined (562) at least in part based on the refractive index of the transparent optical element 440 and the angle θ between the first surface 440-1 of the transparent optical element 440 and the surface 430-1 or 430-2 of reflective spatial light modulator 430.

In some embodiments, the first direction corresponds (564) to a first diffraction order of the grating 420 and the second direction corresponds to a zeroth diffraction order of the grating 420.

In some embodiments, the method 500 includes (operation 566) receiving the second light 492-2 transmitted through the grating 420 at a polarizer 460, and transmitting the second light 492-2 having the second polarization through the polarizer 460.

In some embodiments, the method 500 includes (operation 568) receiving the second light 492-2 at an output assembly 470.

In light of these principles, we now turn to certain embodiments of display devices.

In accordance with some embodiments, a display assembly (e.g., display assembly 400) includes a light source (e.g., light source 410), a grating (e.g., grating 420), and a reflective spatial light modulator (e.g., reflective spatial light modulator 430). The light source is configured to emit illumination light (e.g., illumination light 490). The reflective spatial light modulator is configured to receive the illumination light and reflect at least a portion of the illumination light. The grating is positioned to (i) redirect the illumination light output from the light source toward the reflective spatial light modulator, (ii) receive at least a portion of the reflected light from the reflective spatial light modulator, (iii) redirect first light (e.g., first light 492-1) having a first polarization toward the light source, and (iv) transmit second light (e.g., second light 492-2) having a second polarization through the grating. The second polarization is orthogonal to the first polarization.

In some embodiments, an optical surface (e.g., surface 420-1 or 420-2) of the grating (e.g., grating 420) is non-parallel and non-perpendicular to a surface (e.g., surface 430-1 or 430-2) of the reflective spatial light modulator (e.g., reflective spatial light modulator.

In some embodiments, the display assembly (e.g., display assembly 400) further includes a transparent optical element (e.g., transparent optical element 440) that has a first surface (e.g., first surface 440-1) and a second surface (e.g., second surface 440-2) that is non-parallel to the first surface and parallel to a surface (e.g., surface 430-1 or 430-2) of the reflective spatial light modulator (e.g., reflective spatial light modulator 430). The grating (e.g., grating 420) is disposed on the first surface (e.g., first surface 440-1) of the transparent optical element.

In some embodiments, the transparent optical element (e.g., transparent optical element 440) is disposed between the grating (e.g., grating 420) and the reflective spatial light modulator (e.g., reflective spatial light modulator 430). The transparent optical element has a refractive index that is different from the refractive index of air. The first surface (e.g., first surface 440-1) of the transparent optical element forms an angle (e.g., angle θ) with the surface (e.g., surface 430-1 or 430-2) of the reflective spatial light modulator.

In some embodiments, the display assembly (e.g., display assembly 400) further includes an absorptive polarizer (e.g., polarizer 450) disposed between the light source (e.g., light source 410) and the grating (e.g., grating 420) and configured to transmit illumination light (e.g., illumination light 490) having the first polarization.

In some embodiments, display assembly (e.g., display assembly 400) further includes an output assembly (e.g., output assembly 470) configured to receive the second light (e.g., second light 492-2) output from the grating (e.g., grating 420). The grating is disposed between the reflective spatial light modulator (e.g., reflective spatial light modulator 430) and the output assembly.

In some embodiments, the display assembly (e.g., display assembly 400) further includes a polarizer (e.g., polarizer 460) configured to transmit the second light (e.g., second light 492-2) having the second polarization.

In some embodiments, the reflective spatial light modulator includes a plurality of pixels (e.g., pixels 431, including pixels 431-1, 431-2, 431-3, . . . , 431-n) and a respective pixel (e.g., pixel 431-1) of the plurality of pixels is individually activatable. In some embodiments, a respective pixel of the plurality of pixels is configured to receive the illumination light (e.g., illumination light 490) having a first polarization (e.g., a first linear polarization) and provide (i) first light (e.g., first light 492-1) having the first polarization while the respective pixel is in a first state and (ii) second light (e.g., second light 492-2) having a second polarization that is orthogonal to the first polarization while the respective pixel is in a second state that is different from the first state.

In some embodiments, the reflective spatial light modulator (e.g., reflective spatial light modulator 430) includes a reflective surface (e.g., reflective surface 432), a quarter wave plate (e.g., optical retarder 433), and a layer of optically anisotropic molecules (e.g., layer of optically anisotropic molecules 434) disposed between the reflective surface and the quarter wave plate.

In some embodiments, the reflective spatial light modulator (e.g., reflective spatial light modulator 430) is a liquid crystal optical on silicon display (e.g., LCoS display).

In accordance with some embodiments, a method (e.g., method 500) includes (operation 510) receiving illumination light (e.g., illumination light 490) having a first polarization at a grating (e.g., grating 420), and (operation 520) redirecting, with the grating, the illumination light toward a reflective spatial light modulator (e.g., reflective spatial light modulator 430). The method further includes (operation 530) receiving the illumination light redirected by the grating at the reflective spatial light modulator, and (operation 540) providing, by the reflective spatial light modulator, first light (e.g., first light 492-1) having the first polarization and second light (e.g., second light 492-2) having a second polarization that is orthogonal to the first polarization. The method further includes (operation 550) receiving the first light and the second light at the grating; and (operation 560) directing, with the grating, the first light toward a first direction; and directing, with the grating, the second light toward a second direction that is different from the first direction. In some embodiments, directing, with the grating, the second light toward the second direction includes transmitting the second light through the grating.

In some embodiments, the reflective spatial light modulator (e.g., reflective spatial light modulator 430) includes a plurality of pixels (e.g., pixels 431, including pixels 431-1, 431-2, 431-3, . . . , 431-*n*). In some embodiments, providing the first light (e.g., first light 492-1) includes (operation 542) reflecting the illumination light (e.g., illumination light 490) as the first light at a first pixel (e.g., a first pixel 431-1) of the plurality of pixels (e.g., pixels 431) while the first pixel is in a first state, and (operation 552) providing the second light (e.g., second light 492-2) includes reflecting the illumination light as the second light at a second pixel (e.g., second pixel 431-2**) of the plurality of pixels while the second pixel is in a second state that is different from the first state.

In some embodiments, the method (e.g., method 500) further includes (operation 502) outputting initial light (e.g., initial light 489) from a light source (e.g., light source 410), (operation 502) receiving the initial light at an absorptive polarizer (e.g., polarizer 450) and transmitting, through the absorptive polarizer, at least a portion of the initial light having the first polarization as the illumination light (e.g., illumination light 490).

In some embodiments, method (e.g., method 500) further includes (operation 504) outputting the illumination light (e.g., illumination light 490) from a light source (e.g., light source 410). Additionally, the grating (e.g., grating 420) may be disposed between the light source and the reflective spatial light modulator (e.g., reflective spatial light modulator 430).

In some embodiments, the method (e.g., method 500) further includes (operation 566) receiving the second light transmitted through the grating at a polarizer, and transmitting the second light having the second polarization through (e.g., by) the polarizer.

In some embodiments, the method (e.g., method 500) further includes (operation 568) receiving the second light (e.g., second light 492-2) at an output assembly (e.g., output assembly 470).

In some embodiments, an optical surface (e.g., surface 420-1 or 420-2) of the grating (e.g., grating 420) is non-parallel and non-perpendicular to a surface (e.g., surface 430-1 or 430-2) of the reflective spatial light modulator (e.g., reflective spatial light modulator 430). For example, as shown in FIGS. 4A-4C, an optical surface of the grating forms an angle (e.g., angle θ) with respect to a surface of the reflective spatial light modulator.

In some embodiments, the grating (e.g., grating 420) is disposed on a first surface (e.g., first surface 440-1) of a transparent optical element (e.g., transparent optical element 440). The transparent optical element has a second surface (e.g., second surface 440-2) that is non-parallel to the first surface and parallel to a surface (e.g., surface 430-1 or 430-2) of the reflective spatial light modulator (e.g., reflective spatial light modulator 430). For example, as shown in FIGS. 4A-4C, the first surface of the transparent optical element forms an angle (e.g., angle θ) with respect to the second surface of the transparent optical element.

In some embodiments, (operation 518) the transparent optical element (e.g., transparent optical element 440) is disposed between the grating (e.g., grating 420) and the reflective spatial light modulator (e.g., reflective spatial light modulator 430). The transparent optical element has a refractive index that is different from the refractive index of air, and the first surface (e.g., first surface 440-1) of the transparent optical element forms an angle (e.g., angle θ, and acute angle) with the surface (e.g., surface 430-1 or 430-2) of the reflective spatial light modulator. Each of the first direction and the second direction is determined at least in part by the refractive index of the transparent optical element and the angle between the first surface of the transparent optical element and the surface of reflective spatial light modulator.

In some embodiments, as shown in FIG. 4C, the reflective spatial light modulator (e.g., reflective spatial light modulator 430) includes a reflective surface (e.g., reflective surface 432), a quarter wave plate (e.g., optical retarder 433), and a layer of optically anisotropic molecules (e.g., layer of optically anisotropic molecules 434) that is disposed between the reflective surface and the quarter wave plate.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display assembly, comprising:
 a light source configured to emit illumination light;
 a reflective spatial light modulator configured to receive the illumination light and reflect at least a portion of the illumination light; and
 a grating positioned to:
  redirect the illumination light output from the light source toward the reflective spatial light modulator;
  receive at least a portion of the reflected light from the reflective spatial light modulator;
  redirect first light having a first polarization toward the light source; and
  transmit second light having a second polarization orthogonal to the first polarization through the grating.

2. The display assembly of claim 1, wherein an optical surface of the grating is non-parallel and non-perpendicular to a surface of the reflective spatial light modulator.

3. The display assembly of claim 1, further comprising a transparent optical element having a first surface and a second surface that is non-parallel to the first surface and parallel to a surface of the reflective spatial light modulator, and the grating is disposed on the first surface of the transparent optical element.

4. The display assembly of claim 3, wherein:
the transparent optical element is disposed between the grating and the reflective spatial light modulator;
the transparent optical element has a refractive index that is different from a refractive index of air; and
the first surface of the transparent optical element forms an angle with the surface of the reflective spatial light modulator.

5. The display assembly of claim 1, further comprising an absorptive polarizer disposed between the light source and the grating and configured to transmit illumination light having the first polarization.

6. The display assembly of claim 1, further comprising an output assembly configured to receive the second light output from the grating, wherein the grating is disposed between the reflective spatial light modulator and the output assembly.

7. The display assembly of claim 6, further comprising a polarizer configured to transmit the second light having the second polarization.

8. The display assembly of claim 1, wherein:
the reflective spatial light modulator includes a plurality of pixels; and
a respective pixel of the plurality of pixels is individually activatable.

9. The display assembly of claim 1, wherein the reflective spatial light modulator includes a reflective surface, a quarter wave plate, and a layer of optically anisotropic molecules disposed between the reflective surface and the quarter wave plate.

10. The display assembly of claim 1, wherein the reflective spatial light modulator is a liquid crystal optical on silicon display.

11. A method, comprising:
receiving illumination light at a grating;
redirecting, with the grating, the illumination light toward a reflective spatial light modulator;
receiving, at the reflective spatial light modulator, the illumination light redirected by the grating;
providing, by the reflective spatial light modulator, first light having a first polarization and second light having a second polarization that is orthogonal to the first polarization;
receiving the first light and the second light at the grating;
directing, with the grating, the first light toward a first direction; and
directing, with the grating, the second light toward a second direction that is different from the first direction.

12. The method of claim 11, further comprising:
outputting initial light from a light source;
receiving the initial light at an absorptive polarizer; and
transmitting, through the absorptive polarizer, at least a portion of the initial light having the first polarization as the illumination light.

13. The method of claim 11, further comprising:
outputting the illumination light from a light source, wherein the grating is disposed between the light source and the reflective spatial light modulator.

14. The method of claim 11, further comprising:
receiving, at a polarizer, the second light transmitted through the grating; and
transmitting, through the polarizer, the second light having the second polarization.

15. The method of claim 11, further comprising:
receiving the second light at an output assembly.

16. The method of claim 11, wherein:
the reflective spatial light modulator includes a plurality of pixels;
providing the first light includes reflecting, at a first pixel of the plurality of pixels, at least a portion of the illumination light as the first light while the first pixel is in a first state; and
providing the second light includes reflecting, at a second pixel of the plurality of pixels, at least a portion of the illumination light as the second light while the second pixel is in a second state different from the first state.

17. The method of claim 11, wherein an optical surface of the grating is non-parallel and non-perpendicular to a surface of the reflective spatial light modulator.

18. The method of claim 11, wherein:
the grating is disposed on a first surface of a transparent optical element; and
the transparent optical element has a second surface that is non-parallel to the first surface and parallel to a surface of the reflective spatial light modulator.

19. The method of claim 18, wherein:
the transparent optical element is disposed between the grating and the reflective spatial light modulator;
the transparent optical element has a refractive index that is different from a refractive index of air;
the first surface of the transparent optical element forms an acute angle with the surface of the reflective spatial light modulator; and
each of the first direction and the second direction is determined at least in part by the refractive index of the transparent optical element and the angle between the first surface of the transparent optical element and the surface of the reflective spatial light modulator.

20. The method of claim 11, wherein the reflective spatial light modulator includes a reflective surface and a layer of optically anisotropic molecules disposed over the reflective surface.

* * * * *